United States Patent
T V et al.

(10) Patent No.: US 7,400,624 B2
(45) Date of Patent: Jul. 15, 2008

(54) HASHING BASED MESSAGING APPROACH TO A CLUSTER

(75) Inventors: Venkateshwara T V, Bangalore (IN); Ajay Kumar, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 997 days.

(21) Appl. No.: 10/445,746

(22) Filed: May 27, 2003

(65) Prior Publication Data

US 2004/0240462 A1  Dec. 2, 2004

(51) Int. Cl.
*H04L 12/00* (2006.01)
(52) U.S. Cl. .................. 370/390; 370/432; 709/206
(58) Field of Classification Search .............. 370/432, 370/392, 390; 709/229, 206, 230; 713/201; 719/313; 380/278
See application file for complete search history.

(56) References Cited

U.S. PATENT DOCUMENTS

| | | | | |
|---|---|---|---|---|
| 7,177,917 | B2 * | 2/2007 | Giotta | 709/219 |
| 7,293,038 | B2 * | 11/2007 | Blevins et al. | 707/102 |
| 2002/0044560 | A1 | 4/2002 | Dally et al. | |
| 2003/0035425 | A1 * | 2/2003 | Abdollahi et al. | 370/392 |
| 2004/0098490 | A1 * | 5/2004 | Dinker et al. | 709/229 |
| 2004/0143631 | A1 * | 7/2004 | Banerjee et al. | 709/206 |
| 2004/0240458 | A1 | 12/2004 | T V | |
| 2004/0254993 | A1 * | 12/2004 | Mamas | 709/206 |
| 2005/0074000 | A1 * | 4/2005 | Yokoyama et al. | 370/386 |

OTHER PUBLICATIONS

Mark Hapner Java Message Service The JMS API is an API for accessing enterprise messaging systems from Java programs Version 1.1 Apr. 12, 2002. Sun microsystems. 901 San Antoni Road. Palo Alto, Ca. 94303 U.S.A.*

Richard Monson-Haefel, "EJB Message-Driven Beans," http://www.onjava.com,/lpt/a/1019, Sep. 2001, (28 pages).

"Message-Oriented Middleware Software Technology Review," http://www.sei.cmu.edu/str/descriptions/momt_body.html, Jan. 10, 1997, (4 pages).

"Java Message Service API," Chapter 1 and Chapter 2, The J2EE Tutorial Addendum, Feb. 10, 2003 (9 pages).

John Wetherill, "Messaging Systems and the Java Message Service," http://developer.java.sun.com/developer/technicalArticles/Networking/messaging/, Mar. 31, 2003 (5 pages).

"What is a Message Driven Bean?" http://www.theserverside.com/resources/article.jsp?1=Pramati- MDB, Mar. 31, 2003 (3 pages).

(Continued)

*Primary Examiner*—Min Jung
(74) *Attorney, Agent, or Firm*—Robert C. Kowert; Meyertons, Hood, Kivlin, Kowert & Goetzel, P.C.

(57) ABSTRACT

In a system and method for distributing and processing messages, a message may be sent to a message middleware component by a message producer. The message middleware component may provide the message to a cluster of nodes (such as a cluster of application servers or a cluster of application components). The node may implement a message verifier to determine if it is the node responsible for processing the message. The node that is responsible for processing the message may process the message and communicate the result to the other nodes. The other nodes not responsible for processing the message may ignore the message.

32 Claims, 6 Drawing Sheets

OTHER PUBLICATIONS

Benoy Jose, "Message Driven Beans," http://javaboutique.internet.com/articles/MDB/, Mar. 31, 2003 (3 pages).

Dion Almaer, "EJB 2 Message-Driven Beans," http://www.onjava.com/lpt/a/851, May 22, 2001, (8 pages).

Mike Bray "Middleware Software Technology Review," http://www.sei.cmu.edu/str/descriptions/middleware.html, Jun. 25, 1997, (4 pages).

"High Performance JMS Messaging," JMS Performance Benchmark White Paper, Chrimson Consulting Group, 2002, (9 pages).

Jonathan Baker, "Advanced Uses of Messaging for the Java™ 2 Platform, Enterprise Edition (J2EE™)" 2001 (45 pages).

Dean Jacobs, Building Active Web Sites Using the Java™ Message Service API (JMS), JavaOne, 2000, (28 pages).

* cited by examiner

HASHING BASED MESSAGING APPROACH TO A CLUSTER

BACKGROUND OF THE INVENTION

1. Field of the Invention

This invention relates to computer application messaging, and more particularly to managing application messages in a clustered container.

2. Description of the Related Art

As network functionality increases, it is becoming increasingly more important for systems to allow applications and application components to be distributed across networks (e.g., on multiple application servers). For applications and application components to be effectively distributed, various distributed parts of applications and application components (i.e. nodes) need to be able to communicate with each other. Nodes may communicate with each other using messaging to exchange information. The information may be sent and received by nodes using only a predetermined message format and a destination address for the message. A node may be a software component or process that runs on a common computer or different computers connected by a network or networks. A node may be a message producer and/or a consumer. The predetermined message format may include a message header for message identification, a properties section for application-specific, provider-specific, and optional header fields, and a body section that contains the content of the message. The content of a message may include text, data packets, objects, or other information to be communicated between nodes.

Several different types of messaging systems may be used for communicating between nodes including point-to-point and publish-and-subscribe. As seen in FIG. 1a, in a point-to-point messaging system (generally a one-to-one delivery), a message 105 may be sent by a message producer 101 to a message consumer 103 through a message queue 110 (also known as a virtual channel). For example, a message producer 101 may send a message 105 to a message queue 110 for a message consumer 103. The message consumer 103 receives and processes the message 105 from the message queue 110.

As seen in FIG. 1b, in a publish-and-subscribe messaging system (generally a one-to-many broadcast), the message producer 101 may be a publisher for a topic 123 (also known as a virtual channel) that sends a message 115 to several message consumers (known as subscribers) that have subscribed to the topic 123. For example, the message producer 101 may send a message 115 to a topic 123. Several nodes, such as the message consumer 103 and the second message consumer 121 may subscribe (i.e., request that messages of a certain type be sent to the node when available) to the topic 123. The topic 123 may deliver the message 115 to the message consumer 103 and the second message consumer 121. Message consumers not subscribed to the topic do not receive the message.

To facilitate sending and receiving messages, nodes typically connect to a messaging agent for implementing message queues and/or topics. One example of a messaging agent may be implemented according to the Java Messaging Service (JMS). Messages may be sent and received asynchronously, and nodes sending and receiving messages do not typically need to know anything about the nodes they are communicating with. This allows more freedom between nodes and makes it easier to design interfaces between nodes and easier to distribute applications and application components across a network.

Some network environments may utilize clustered systems (e.g., clustered message driven bean (MDB) containers). A clustered system may include nodes participating in a messaging system. A cluster may include multiple nodes that behave as a single node in the messaging system. For example, a node may be a "bean" (e.g., an application component) clustered with other message driven beans. Message driven beans may use JMS to access message-oriented middleware (MOM) for messaging with other nodes (e.g., MDBs) in a network. A cluster of nodes may need to appear as a single producer/consumer for typical messaging systems. For example, confusion may result if two nodes in a cluster receive and process a topic message for which the cluster has subscribed to as a single entity. Also, it may be desirable for a cluster to support numerous different message-oriented middleware products.

SUMMARY

In one embodiment, a system may include a message producer, a message middleware component, and at least one message consumer. A message middleware component may be configured to receive a message from the message producer and pass the message to a message consumer. In one embodiment, a message consumer may include a cluster of message consumer nodes (each of which may be a message consumer to receive the message). In one embodiment, at least one node in the cluster of nodes may receive the message from the message middleware component and determine for each message received whether it is the node assigned to process the message. In one embodiment, only the node assigned to process the message processes the message. For example, if a node should not process the message, the node may ignore the message.

In one embodiment, at least one node in the plurality of nodes may receive the message through a point-to-point transfer. In one embodiment, the plurality of nodes may receive the message as subscribers to a topic. In another embodiment, at least one node in the plurality of nodes may receive the message from a message-oriented middleware as a subscriber to a topic. In one embodiment, determining whether the node is the node assigned to processing the message may include using a message verifier to calculate a relative value and comparing the calculated relative value to a range of calculated relative values each node is assigned to. In one embodiment, the message verifier may determine a node to process the message using information in the message. For example, the information in the message may include a destination of the message, delivery mode of the message, an identification of the message, a time the message was sent, a type of the message, an expiration of the message, or a priority of the message. In one embodiment, the message may be a Java Message Service (JMS) message and the node may implement a message driven bean.

BRIEF DESCRIPTION OF THE DRAWINGS

A better understanding of the present invention may be obtained when the following detailed description is considered in conjunction with the following drawings.

Figure 1A:
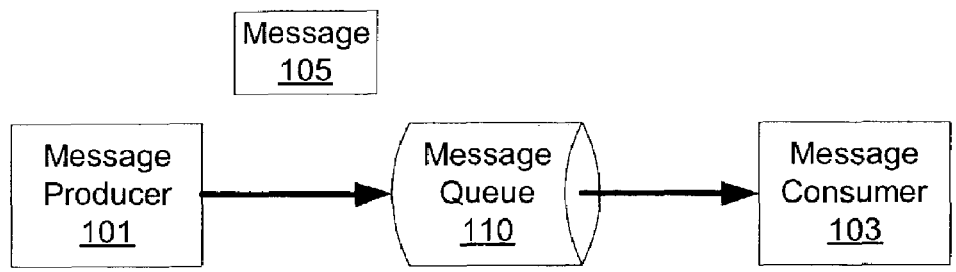
FIG. 1a illustrates a prior art example of a point-to-point messaging system.
Figure 1B:
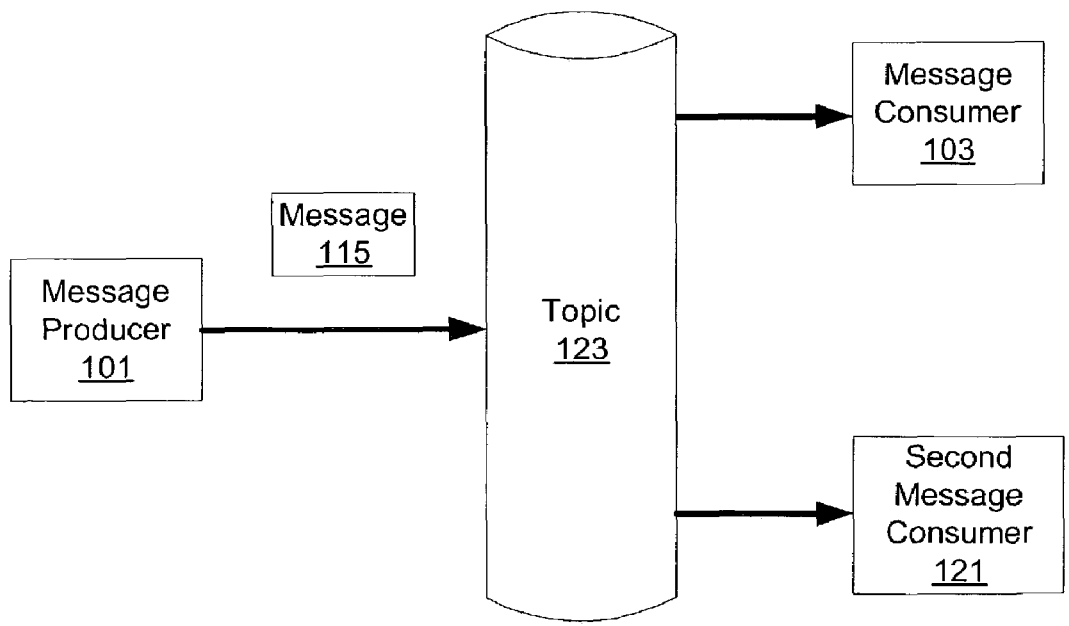
FIG. 1b illustrates a prior art example of a publish-and-subscribe messaging system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 2:
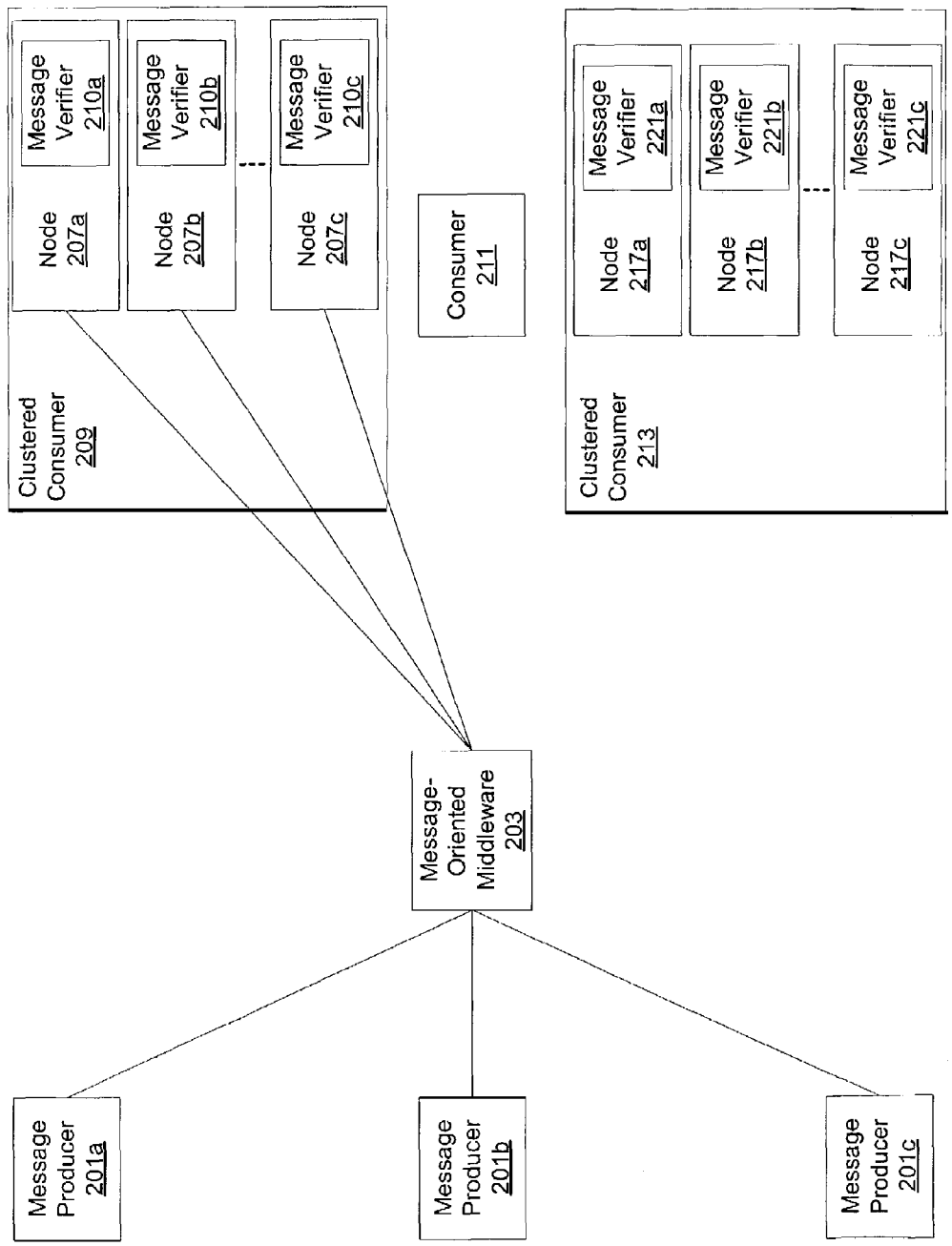
FIG. 2 illustrates a messaging system including multiple clustered consumers, according to an embodiment.

Referring to FIG. 2, an embodiment of a messaging system including multiple clustered consumers is illustrated. As applications and application components (i.e., message producers 201) need to communicate with other components, the message producers 201 may use a messaging system to pass information in the form of messages. A messaging system may be used by a message producer 201 that wants to send a message to a particular message consumer (e.g., message consumer 211) or to broadcast a message to several message consumers (e.g., message consumer 211 and clustered consumer 213). For example, a message producer 201, such as, but not limited to, message producer 201a (which may, for example, be an application on an application server), may produce messages with information for one or more message consumers (which may contain one or more nodes) in the system. For example, clustered consumer 209 may contain nodes 207a, 207b, and 207c. Each node may be an application component running on one or more application servers.

In one embodiment, the nodes 207 may receive a message from a message producer 201 through the message-oriented middleware (MOM) 203. In one embodiment, the MOM 203 may be software distributed among nodes. Other embodiments of MOM 203 are also contemplated. In one embodiment, the MOM may provide an Application Programming Interface (API) to allow application components to be distributed across networks and allow messaging communication between the components and/or between applications by using the MOM 203.

In one embodiment, clustered message consumers 209, 215 may receive messages in a point-to-point message delivery to a respective clustered consumer, or message consumers 209, 215 may receive the message as a subscriber to a topic. In one embodiment, the MOM 203 may receive the message and then distribute a copy of the message to each node 207, 217 in the clustered consumer 209, 213. In one embodiment, each node may include a message verifier 210, 221 to determine if it is the node in the clustered consumer that is responsible for processing the message. In one embodiment, the message verifier may perform a hash or a calculation resulting in a relative value that is compared to a range of relative values each particular node is responsible for. For example, the message verifier may calculate a remainder of dividing a message identifier by a node identifier and then comparing the remainder to a unique message range of values that each node is responsible for. Other calculations, hashes, and methods of distributing responsibility for message processing among nodes 207 in clustered consumer are also contemplated. For example, the message verifier may determine if its node in the cluster of nodes will process the message based on a different message property or other information in the message. For example, the information in the message that may be used in the message verifier to determine which node will process the message may include, but is not limited to, a destination of the message, a delivery mode of the message, an identification of the message, a time the message was sent, a type of the message, an expiration of the message, and a priority of the message. In some embodiments, a hash of one or any combination of such properties may be used to determine if a message is assigned to a particular node.

Messages communicated between message producers 201 and message consumers may contain several different types of information such as, but not limited to, formatted data and requests for action. In addition, the messages may be in several different formats including, but not limited to, streams of values that are written and read sequentially, pairs of data values including a string and a value, continuous streams of bytes to fit a predetermined message format, and serializable Java objects. In one embodiment, the message may be a Java Message Service (JMS) message.

In one embodiment, the message processing may be handled independent of the type of MOM used (e.g., the message processing may be message-oriented middleware neutral). Because the message processing is independent of the MOM 203, numerous different MOM products may be interfaced with clustered consumers.

In one embodiment, responsibility for message handling may be divided among the nodes of the cluster. Each node may be responsible for determining if it should handle the message. Each node 207 receiving the message may use a message verifier 210 to determine if it should process the message so that only one node the cluster processes the message. If the message verifier determines that messaging handling responsibility is not assigned to its node, the message maybe ignored by that node. As a result, the cluster may act as a single consumer in the messaging system. For example, the MOM 203 may send copies of the message to each node in the cluster. The nodes 207 in the cluster may use a message verifier 210 to determine which node of the message consumer nodes 207 should process the message. For a subsequent message received from a queue, the MOM 203 may send a copy of the message to all of the nodes 207 in the cluster and a different node may be responsible for handling the message according to the message verifier 210. For topic messages, the MOM 203 may send a copy of the message to each node 207 in the cluster. Each node 207 in the cluster may use a message verifier 210 to select a single one of the nodes 207 of the cluster to process the topic message. In one embodiment, each node may perform a hash of one or more message properties for each message received by the cluster to determine if the hash value falls within a predetermined range assigned to that node. If the hash falls within a range assigned to a node, that node processes the message and the other nodes ignore the message.

The MOM 203 may establish a queue for each message consumer node in the cluster. In one embodiment, the MOM 203 may put each message in an appropriate queue for each cluster node. Each node receives the message and determines if it is the node responsible for processing the message.

Figure 3:
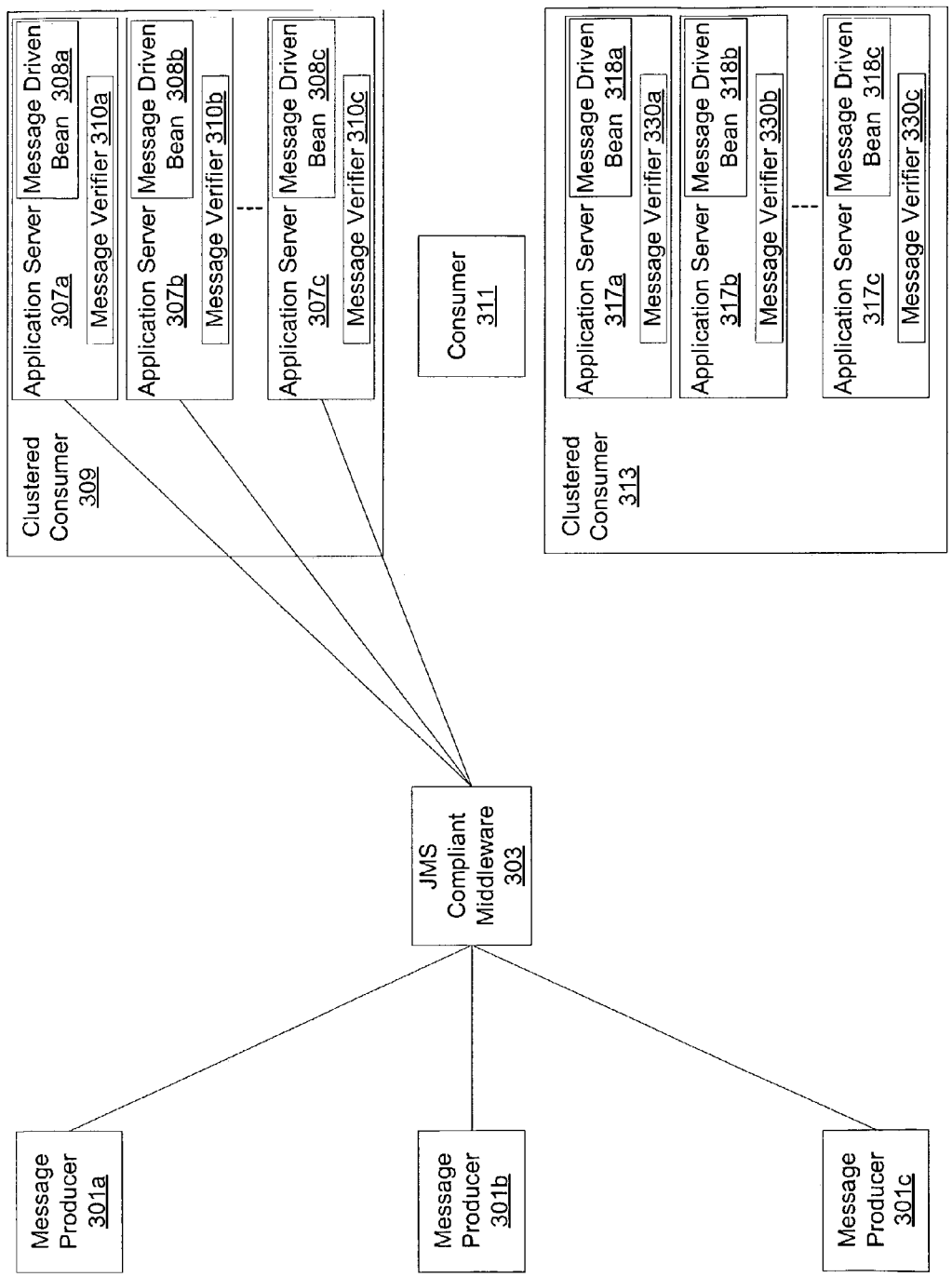
FIG. 3 illustrates a JMS based messaging system including multiple clustered application servers, according to an embodiment.

Referring to FIG. 3, an embodiment of a JMS based messaging system including multiple clustered application servers is shown. In one embodiment, a message producer 301 may produce messages to provide to a messaging middleware, such as, but not limited to Java Messaging Service (JMS) compliant middleware 303. In one embodiment, the JMS compliant middleware 303 may provide the message to each application server 307 in the clustered consumer 309. For example, the MOM 309 may receive the message in a point-to-point message transfer or as a subscriber to a topic. The MOM 309 may then provide the message to each node (e.g., application servers 307) in a clustered consumer 309. In one embodiment, each application server 307 may implement a message verifier, such as message verifier 310a, message verifier 310b, and message verifier 310c, to determine which node in a cluster of nodes will process the message. The node responsible for processing the message may then process the message. The other nodes may ignore the message. In one embodiment, the node may implement a message driven bean (an application component), such as, but not limited to, message driven bean 308a, 308b, and 308c. Message driven beans 313 may act as consumers of the message in the application servers 309. Other consumers are also contemplated.

Figure 4:
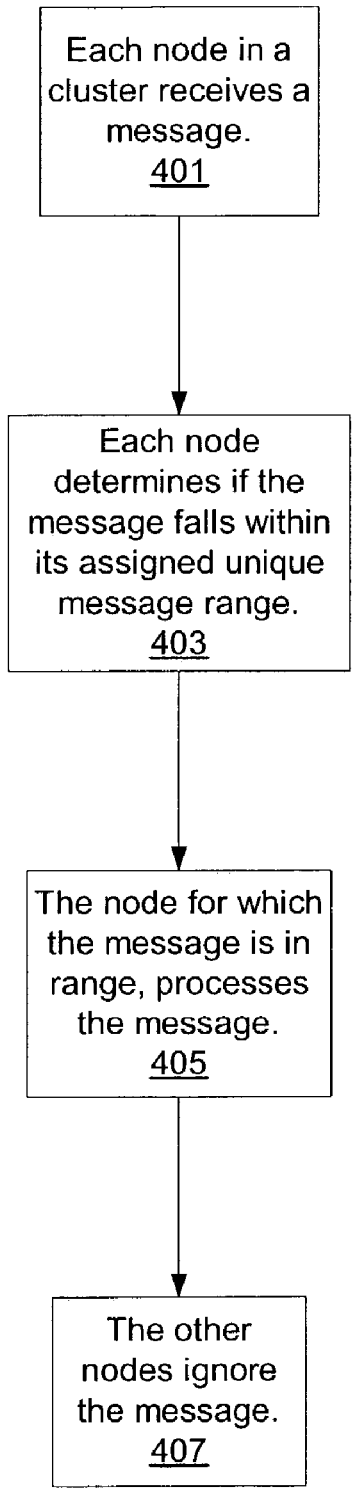
FIG. 4 illustrates a flowchart for each node computing a hash to determine which node should process the message, according to an embodiment.

FIG. 4 illustrates a flowchart of an embodiment of each node computing a hash to determine which node should process the message. It should be noted that in various embodiments of the methods described below, one or more of the processes described may be performed concurrently, in a different order than shown, or may be omitted entirely. Other additional processes may also be performed as desired.

In 401, each node in a cluster of nodes (e.g., a clustered consumer) may receive a message. In one embodiment, the message received may be received because the node was subscribed to a topic. In one embodiment, the node may receive the message in a point-to-point message delivery.

In 403, each node may determine if the message falls within its assigned unique message range. For example, each node may implement a hash to determine if it is the node responsible for processing the message.

In 405, the node for which the message is in range may process the message. In one embodiment, a message driven bean may process the message. In one embodiment, results from processing the message may be sent from the node that processed the message to the other nodes in the cluster of nodes.

In 407, the other nodes in the cluster of nodes may ignore the message. In one embodiment, the messaging system may want to insure that only one node processes the message. In addition, the messaging system may want to insure that it only needs to send the message once. In one embodiment, the other nodes may send an acknowledgement of receipt of the message and then ignore it. In one embodiment, only the node that processes the message may send an acknowledgement of receipt. In another embodiment, no acknowledgement of receipt may be sent.

Figure 5:
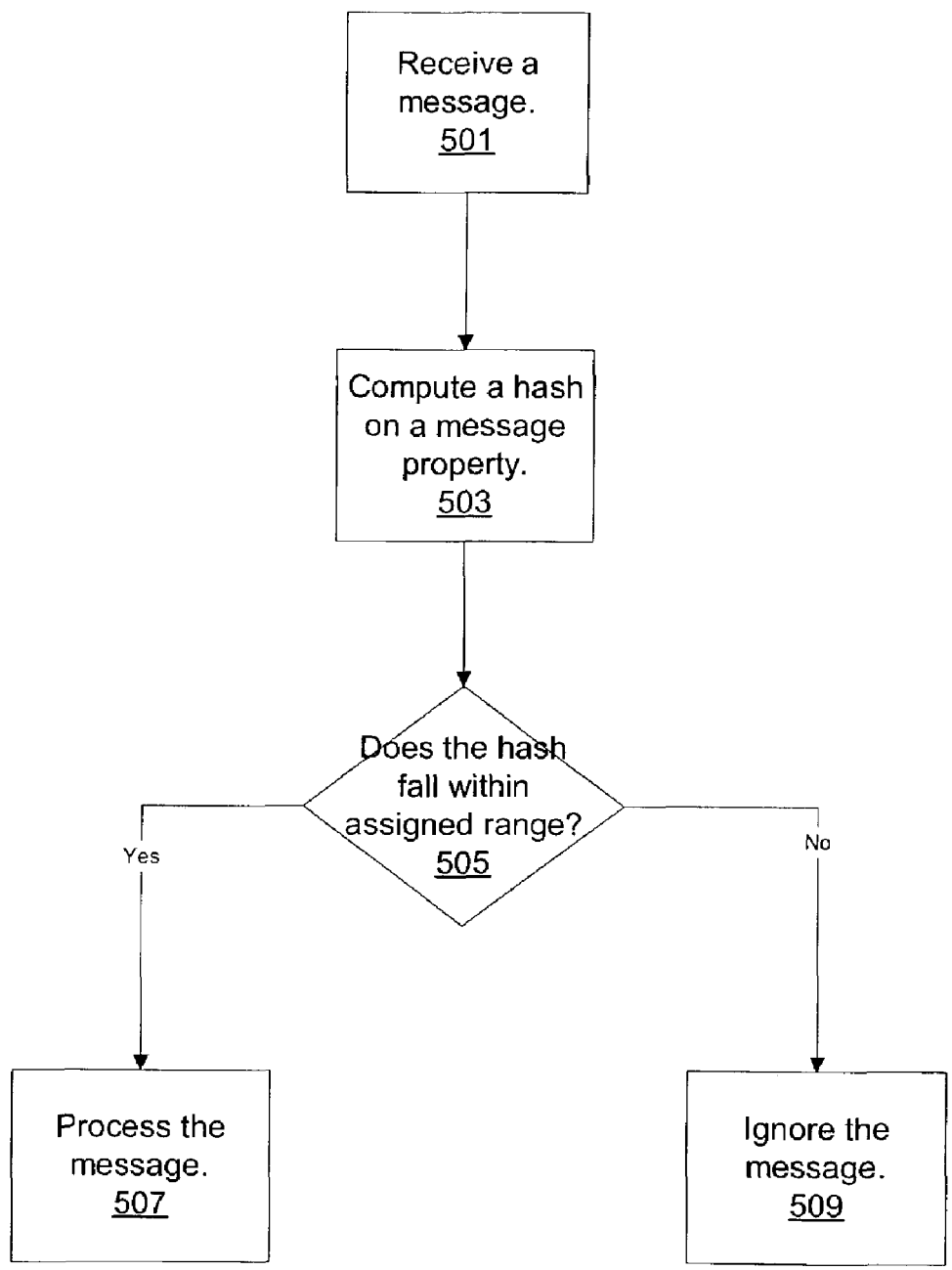
FIG. 5 illustrates a flowchart for a node computing a hash to determine if it should process a message, according to an embodiment.

FIG. 5 illustrates a flowchart of an embodiment of a node or message verifier computing a hash to determine if the node should process a message. It should be noted that in various embodiments of the methods described below, one or more of the processes described may be performed concurrently, in a different order than shown, or may be omitted entirely. Other additional processes may also be performed as desired.

In 501, a message may be received. For example, each node in a cluster of nodes may receive a message from a MOM coupled to the nodes. The node may receive the message as a point-to-point message transfer or as a subscriber to a topic. In one embodiment, each node may receive a message directly from a message-oriented middleware (e.g., each node may subscribe to a topic).

In 503, a hash may be computed by each node to determine if the node is the node responsible for processing the message. In one embodiment, the hash may be computed based on a message property. For example, a message identification number for the message may be divided by a node number for the node in the cluster of nodes and the remainder used as the hash value.

In 505, the node may determine if the hash falls within an assigned range. In some embodiments, the assigned range may not be sequential. For example, a table may indicate hash values for a particular node.

In 507, if the hash is within an assigned range, the message may be processed. In one embodiment, a result from processing the message may be accessible to the other nodes in the cluster of nodes.

In 509, if the hash is not within the assigned range, the message may be ignored by that node. In one embodiment, the node may send an acknowledgement of receipt for the message even if it is not the node that is responsible for processing the message.

Figure 6:
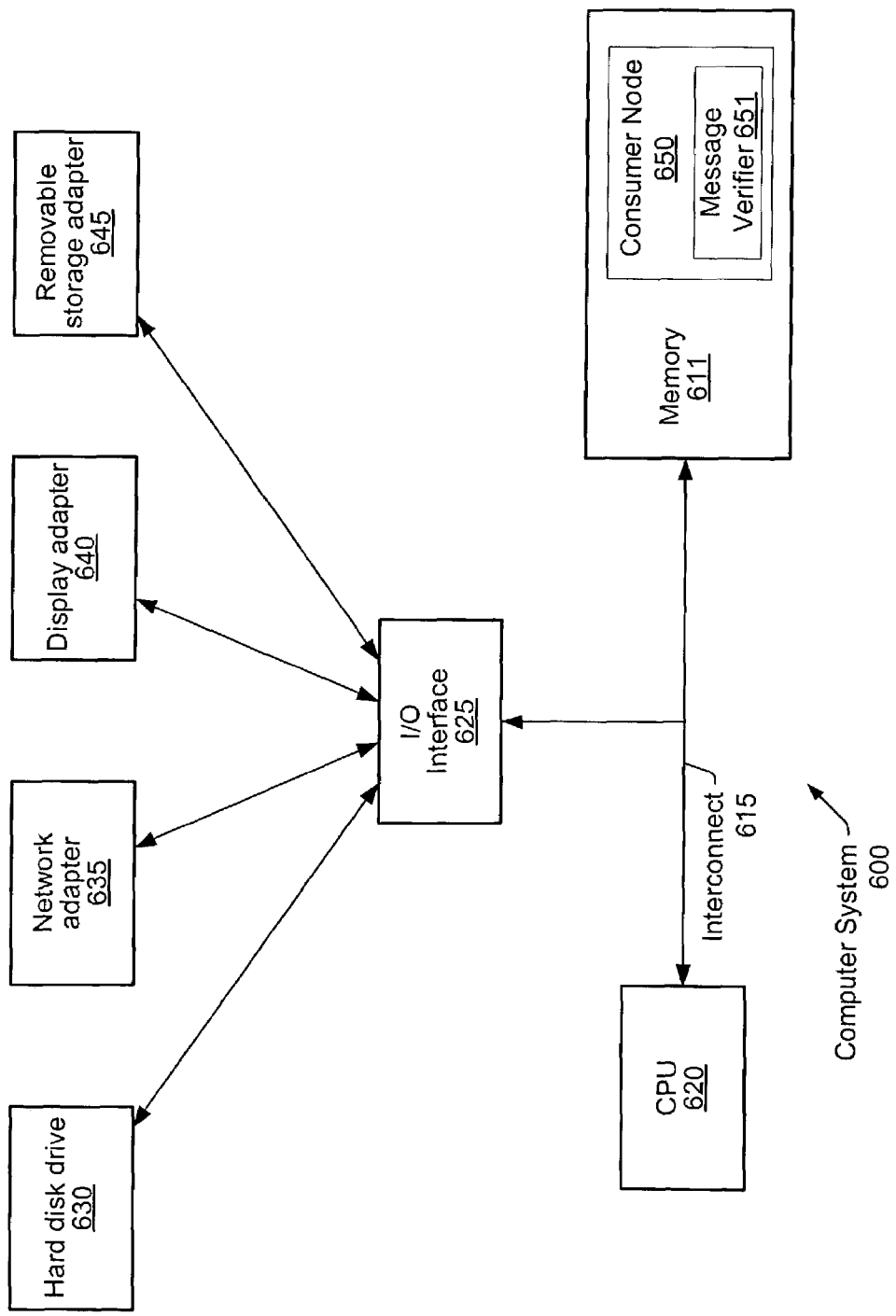
FIG. 6 illustrates a system for using a hash to select a node to process a message, according to an embodiment.

FIG. 6 illustrates an embodiment of a system including program instructions for a node of a clustered message consumer configured to select a node to process a message. The node may include a message verifier. In one embodiment, a computer system 600 may include a central processing unit (CPU) 620 coupled to a memory 611 and an input/output (I/O) interface 625. In one embodiment, an interconnect 615 may be used to couple the CPU to the memory 611. The memory 611 may store program instructions for a consumer node 650. In one embodiment, each consumer node 650 may include a message verifier 651. In one embodiment, the I/O interface 625 may be coupled to a hard disk drive 630, a network adapter 635, a display adapter 640, and a removable storage adaptor 645. Other components may also be coupled to the I/O interface.

Various embodiments may further include receiving or storing instructions and/or information implemented in accordance with the foregoing description upon a computer accessible medium. Suitable computer accessible media may include storage media or memory media such as magnetic or optical media, e.g., disk or CD-ROM, random access memory, or other memory, as well as transmission media or signals such as electrical, electromagnetic, or digital signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system, comprising:
   a message middleware component configured to receive a plurality of messages from one or more message producers;

a cluster of message consumer nodes comprising at least two nodes, wherein the cluster is configured so that each of the at least two nodes receives each message of a plurality of messages from the message middleware component;

wherein each node of the cluster determines for each one of the plurality of messages received whether it is the node in the cluster of nodes assigned to process the message; and wherein only the node assigned to process the message processes the message so that each one of the plurality of messages is processed by only one node of the cluster.

2. The system as recited in claim 1, wherein the at least two nodes receive the message as a subscriber to a topic.

3. The system as recited in claim 1, wherein the message s received by at least one node in the at least two nodes through a point-to-point transfer.

4. The system as recited in claim 1, wherein the cluster of message consumer nodes comprises a message middleware neutral interface to the message middleware component such that the cluster of message consumer nodes may participate in messaging with a plurality of different types of message middleware components.

5. The system as recited in claim 1, wherein at least one node in the cluster of message consumer nodes receives the message from a message-oriented middleware as a subscriber to a topic.

6. The system as recited in claim 1, wherein determining for each message received whether the node is the node assigned to processing the message includes calculating a relative value and comparing the calculated relative value to a range of calculated relative values each message consumer node is assigned to.

7. The system as recited in claim 1, wherein a message verifier determines a node to process the message using information in the message.

8. The system as recited in claim 7, wherein the information in the message utilized to determine a node to process the message includes a destination of the message, a delivery mode of the message, an identification of the message, a time the message was sent, a type of the message, an expiration of the message, or a priority of the message.

9. The system as recited in claim 7, further comprising the node in the cluster of nodes that processes the message according to the message verifier, acknowledges receipt of the message to a message source.

10. The system as recited in claim 1, wherein if a node is not assigned to process the message, the node ignores the message.

11. The system as recited in claim 1, wherein the message is a Java Message Service (JMS) message and the node assigned to process the message implements a message driven bean.

12. The system as recited in claim 1, wherein each node in the at least two nodes subscribes to a topic.

13. The system as recited in claim 1, wherein each message consumer node is implemented within an application server container.

14. The system as recited in claim 1, wherein the message is processed neutral to the message-oriented middleware.

15. A method, comprising:

receiving a plurality of messages at a clustered message consumer comprising a plurality of message consumer nodes, wherein a subset of the nodes receives the message, wherein the subset comprises at least two of the plurality of message consumer nodes;

for each of the plurality of messages:
  determining which node in the subset of nodes is assigned to a unique message range that the message falls within; and
  processing the message, wherein the node in the subset of nodes assigned to the unique message range the message falls within processes the message so that only one node processes the message for the subset.

16. The method as claimed in claim 15, wherein the message is received through a message-oriented middleware, wherein each node in the subset of nodes that received the message subscribed to a topic associated with the message.

17. The method as recited in claim 15, wherein the subset of nodes receives the message as a subscriber to a topic.

18. The method as recited in claim 15, wherein at least one node in the subset of nodes receives the message through a point-to-point transfer.

19. The method as recited in claim 15, wherein the message is a Java Message Service (JMS) message and the node assigned to process the message implements a message driven bean.

20. The method as recited in claim 15, wherein a message verifier determines a node in the subset of nodes to process the message using information in the message, wherein the information in the message utilized to determine a node to process the message includes a destination of the message, a delivery mode of the message, an identification of the message, a time the message was sent, a type of the message, an expiration of the message, or a priority of the message.

21. The method as recited in claim 15, wherein the clustered message consumer interacts with message producers or with a message oriented middleware component as a single message consumer.

22. The method as recited in claim 15, wherein each message consumer node is implemented within an application server container.

23. The method as recited in claim 15, further comprising the node in the subset of nodes that processes the message acknowledges receipt of the message to a message producer.

24. A computer readable storage medium, comprising program instructions, wherein the program instructions are computer-executable to implement:

receiving a plurality of messages at a clustered message consumer comprising a plurality of message consumer nodes, wherein a subset of the nodes receives the message, wherein the subset comprises at least two of the plurality of message consumer nodes;

for each of the plurality of messages:
  determining which node in the subset of nodes is assigned to a unique message range that the message falls within; and
  processing the message, wherein the node in the subset of nodes assigned to the unique message range the message falls within processes the message so that only one node processes the message for the subset.

25. The computer readable storage medium as claimed in claim 24, wherein the message is received through a message-oriented middleware, wherein each node in the subset of nodes that received the message subscribed to a topic associated with the message.

26. The computer readable storage medium as recited in claim 24, wherein the subset of nodes receives the message as a subscriber to a topic.

27. The computer readable storage medium as recited in claim 24, wherein at least one node in the subset of nodes receives the message through a point-to-point transfer.

28. The computer readable storage medium as recited in claim 24, wherein the message is a Java Message Service (JMS) message and the node assigned to process the message implements a message driven bean.

29. The computer readable storage medium as recited in claim 24, wherein a message verifier determines a node in the subset of nodes to process the message using information in the message, wherein the information in the message utilized to determine a node to process the message includes a destination of the message, a delivery mode of the message, an identification of the message, a time the message was sent, a type of the message, an expiration of the message, or a priority of the message.

30. The computer readable storage medium as recited in claim 24, wherein the clustered message consumer interacts with message producers or with a message oriented middleware component as a single message consumer.

31. The computer readable storage medium as recited in claim 24, wherein each message consumer node is implemented within an application server container.

32. The computer readable storage medium as recited in claim 24, wherein the node in the subset of nodes that processes the message acknowledges receipt of the message to a message producer.

* * * * *